US006330709B1

(12) United States Patent
Johnson et al.

(10) Patent No.: US 6,330,709 B1
(45) Date of Patent: Dec. 11, 2001

(54) VIRTUAL MACHINE IMPLEMENTATION FOR SHARED PERSISTENT OBJECTS

(75) Inventors: Maynard Paul Johnson; Steven Jay Munroe; John Gerard Nistler; James W. Stopyro, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,832

(22) Filed: Mar. 30, 1998

(51) Int. Cl.$^7$ .................................................. G06F 9/45
(52) U.S. Cl. ................... 717/1; 717/5; 707/103
(58) Field of Search ................. 717/1, 11, 8, 3, 717/5; 707/102, 103

(56) References Cited

U.S. PATENT DOCUMENTS

| | | | |
|---|---|---|---|
| 4,853,842 | * 8/1989 | Thatte et al. | 707/206 |
| 5,008,786 | * 4/1991 | Thatte | 711/162 |
| 5,590,326 | * 12/1996 | Manabe | 711/150 |
| 5,664,182 | * 9/1997 | Nierenberg et al. | 707/102 |
| 5,729,739 | * 3/1998 | Cantin et al. | 707/103 |
| 5,771,383 | * 6/1998 | Magee et al. | 709/312 |
| 5,809,507 | * 9/1998 | Cavanaugh, III | 707/103 |
| 5,842,226 | * 11/1998 | Barton et al. | 711/203 |
| 5,845,331 | * 12/1998 | Carter et al. | 711/163 |
| 5,848,274 | * 12/1998 | Hamby et al. | 717/5 |
| 5,848,419 | * 12/1998 | Hapner et al. | 707/103 |

(List continued on next page.)

OTHER PUBLICATIONS

Towards a resilient shared memory concept for distributed persistent object systems, 1995:4869950 Inspec.*

A framework of customizing transactions in persistent object management for advanced applications,: 1995(46):1862 Compendex.*

Title: "Object Directory Design for a Fully Distributed Persistent Object System", Author: Mathew et al, 1996, Source: ASMEPD.*

Title: Integrating parallel functions into the manipulation for distributed persistent objects.Source: IEEE, 1996, Author: Jiang et al.*

Title: Towards a Resilent Shared Memory Concept for Distributed Persistent Object Systems, Author: Irlenbusch et al, source IEEE, 1995.*

Title: Lightweigh Shared Objects in a 64–Bit Operating System, Author: Chase et al, source: ACM, 1992.*

"Java(TM) Persistence via Persistent Virtual Storage" by Johnson et al., Jul. 7, 1997, pp. 1–16.

*Primary Examiner*—Mark R. Powell
*Assistant Examiner*—Chameli C. Das
(74) *Attorney, Agent, or Firm*—S. Jared Pitts; Schmeiser, Olsen & Watts, LLP

(57) ABSTRACT

The preferred embodiment of the present invention facilitates the creation, storage and interaction of persistent objects using single level storage semantics on commodity systems. Specifically, the present invention defines several objects used to implement persistent objects in a shared address space. The preferred embodiment includes a Class Encapsulator class and the Object Encapsulator class that are preferably designed to encapsulate the class data and instance data, respectively. In particular, a Class Encapsulator object would preferably be created in a Persistent Container for each class of objects loaded into that Persistent Container. The Class Encapsulator object would include all of the specific data needed to implement its corresponding class. Likewise, an Object Encapsulator object would preferably be created to encapsulate each object to be stored persistently in the shared address space. A Persistent Handle class is preferably defined to store the shared address space address of the Class Encapsulator object and the Object Encapsulator object.

84 Claims, 4 Drawing Sheets

U.S. PATENT DOCUMENTS

| | | | |
|---|---|---|---|
| 5,862,386 | * | 1/1999 | Joseph et al. .......................... 717/11 |
| 5,870,753 | * | 2/1999 | Chang et al. ........................ 707/103 |
| 5,909,540 | * | 6/2000 | Carter et al. ............................. 714/4 |
| 5,987,506 | * | 11/1999 | Carter et al. ........................ 709/213 |
| 6,003,123 | * | 12/1999 | Carter et al. ........................ 711/207 |
| 6,009,266 | * | 12/1999 | Brownell et al. .................... 395/683 |
| 6,029,177 | * | 2/2000 | Sadiq et al. .......................... 707/201 |
| 6,032,153 | * | 2/2000 | Sadiq et al. .......................... 707/103 |
| 6,052,528 | * | 3/2000 | Dechamboux .......................... 717/8 |
| 6,085,198 | * | 7/2000 | Skinner et al. ...................... 707/103 |
| 6,096,094 | * | 8/2000 | Kay et al. ................................ 717/1 |

\* cited by examiner

FIG. 4

Persistent Container Object

CreateContainer()
setContainerName (String name)
getContainerName()
allocObject (Class clsRef)
allocObjectNear (Class clsRef, Object nearRef)
allocArraynear (int type, int entries, Object nearRef)
allocStringNear (String str, Object nearRef)
allocStringNear (char [ ] str, Object nearRef)
allocArrayOfNear (Class cls, int entries, Object nearRef)
getContainerFor(Object nearRef)
setOwningContainer()

— 244

Persistent ClassLoader Object loadClass()
findClass()
findSystemClass()

— 246

Class Encapsulator Object newinstance()
forname()
getname()
getsuperclass()
getinterfaces()
getclassloader()
isinterface()

— 248

Object Encapsulator object getfield()
putfield()

— 250

Persistent Handle Object lock()
decrementLock()

— 247

VIRTUAL MACHINE IMPLEMENTATION FOR SHARED PERSISTENT OBJECTS

RELATED APPLICATIONS

This application is related to the following U.S. patent applications: "Shared Persistent Objects", Ser. No. 09/050,821, filed on Mar. 30, 1998; "Method and Apparatus for Shared Persistent Virtual Storage on Existing Operating Systems", Ser. No. 09/050,830, filed on Mar. 30, 1998; and "Method and Apparatus for Encapsulating Address Translation for Shared Persistent Virtual Storage", Ser. No. 09/050,831, filed on Mar. 30, 1998, that are hereby incorporated by reference.

BACKGROUND OF THE INVENTION

1. Technical Field

The present invention relates in general to object-oriented computer systems. More specifically, the present invention relates to the field of creating, storing and interacting with persistent objects.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

One particular object-oriented programming language is Java which is specifically designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is an interpreted language. A Java program can be written once and ran on any type of platform that contains a Java Virtual Machine (JVM). Thus, Java is completely platform independent. And third, Java is an object-oriented language, meaning that software written in Java can take advantage of the benefits of object-oriented programming.

One issue in object oriented programming, and Java programing in particular, is object persistence. Typically, when a process ends, all of the references to objects created by the process are lost, and the objects themselves are destroyed. These objects are referred to as transient objects. Persistent objects, as opposed to transient objects, have a lifetime that transcends the lifetime of the process that created them. To make an object persistent, mechanisms must be put in place to allow a persistent object to survive beyond the lifetime of the process from which the object was created so that other processes can access the object. This typically involves the storing of the objects onto permanent storage devices, such as hard disks, optical disks, tape drives, etc.

Many common computer systems use an addressing scheme referred to as the two level storage (TLS) model. The TLS model stores and manipulates data using two systems: a file manager and a virtual memory system. The virtual memory includes the actual memory and a specialized data file called a swap file. The virtual memory system controls the allocation of address space to different processes. The file manager stores and retrieves data from the permanent storage devices in the form of files.

One benefit to using the TLS model is that it provides large amounts of address space to fixed size address machines. This large address space is useful for storing large amounts of information. However, the TLS models does not provide a way for storing persistent objects in a way that can be efficiently used by a computer system.

In particular, in a TLS system persistent data, such as persistent objects, must be stored in files on a disk or other storage medium by the file manager. When a process needs to access a persistent object, the process must contact the file manager which locates the persistent object data in a file on backing store and move a copy of the persistent object data into a memory buffer. The persistent object data must then be reconstructed into a persistent object in memory.

When the data being stored by the TLS model is persistent, several other problems are introduced. For example, persistent objects typically contain many pointers used for sharing data and methods with other objects. When a persistent object is retrieved from backing store and a new runtime representation of the object is created, any internal pointers contained within the persistent object must be converted and rebuilt. Rebuilding persistent objects, and more specifically, converting pointer references contained within persistent objects results in significant overhead on the CPU.

Some TLS systems use externalization techniques to store persistent objects. These techniques pull data from the object and write the externalized data to a data file. When the object is needed again, the data must be read in by the file system and the persistent object recreated using state data. This processes requires reading from the file system to a memory buffer, and copying data from the memory buffer to the object. This also creates significant unwanted CPU overhead.

Another addressing scheme is the single level storage (SLS) model. The SLS system maps all of the storage mediums, including persistent storage mediums such as hard drives, into a single address space. This makes the entire data storage system into a single "virtual memory" that is accessed directly using a single, process independent, address space. In an SLS system, persistent data from the permanent storage mediums can be easily copied to real memory using the virtual memory addressing.

The SLS model is very efficient means of making and manipulating persistent objects because it reduces the amount of system overhead to load persistent objects into memory. As mentioned, when a process needs a persistent object, the persistent object is copied from persistent storage and into real memory. This involves creating only one copy rather than the two copies created by the TLS model. Because pointer references are processes independent, SLS system allows persistent objects, including pointer references contained within persistent objects, to be moved into and from persistent storage without requiring any rebuilding of the persistent object. When a process needs to access a persistent object, the SLS model simply moves this persistent object from the backing store into memory. Stated another way, the SLS model eliminates the need to create a runtime representation of a persistent object since pointer references contained within the persistent object always remain valid. Another advantage to SLS systems is that pointers to objects are process independent. This allows easy sharing of persistent objects between multiple processes.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems continue to have no easy way to provide object persistence.

Without a more efficient mechanism for providing efficient creation, access and sharing of persistent objects, the computer industry will continue to not realize the full potential of the interpreted programming languages such as Java.

SUMMARY OF THE INVENTION

Thus, the preferred embodiment of the present invention facilitates the creation, storage and interaction of persistent objects using single level storage semantics on commodity systems. Specifically, the present invention defines several objects used to implement persistent objects in a shared address space. The preferred embodiment includes a Class Encapsulator class and the Object Encapsulator class that are preferably designed to encapsulate the class data and instance data, respectively. In particular, a Class Encapsulator object would preferably be created in a Persistent Container for each class of objects loaded into that Persistent Container. The Class Encapsulator object would include all of the specific data needed to implement its corresponding class. Likewise, an Object Encapsulator object would preferably be created to encapsulate each object to be stored persistently in the shared address space. A Persistent Handle class is preferably defined to store the shared address space address of the Class Encapsulator object and the Object Encapsulator object.

An advantage of the preferred embodiment of the present invention is that persistent objects can be easily shared using context independent SAS addresses in the SLS model.

The foregoing and other features and advantages of the present invention will be apparent from the following more particular description of the preferred embodiment of the invention, as illustrated in the accompanying drawings.

BRIEF DESCRIPTION OF THE DRAWINGS

FIG. 4 is a block diagram depicting the methods defined for the objects of FIG. 3.

BEST MODE FOR CARRYING OUT THE INVENTION

Figure 1:
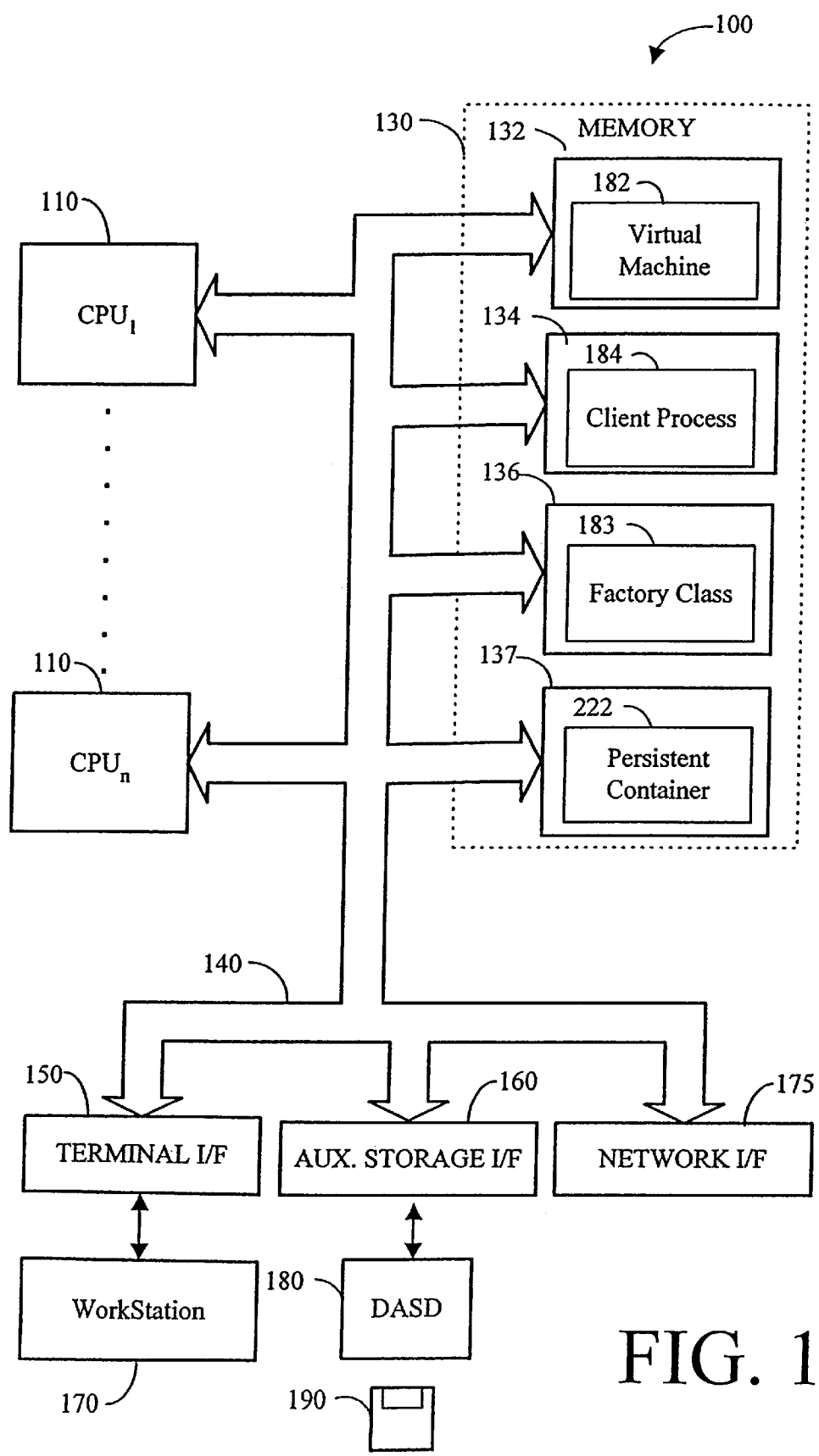
FIG. 1 is a computer system in accordance with a preferred embodiment of the present invention.

A method and apparatus for providing object persistence to existing systems using single level storage (SLS) semantics is provided. The preferred embodiment implements uses encapsulator objects which work together to provide persistent storage. The Virtual Machine (VM) is provided that interacts with methods defined for these objects to provide persistent storage. An overview of Object-Oriented Technology and the Java Programming Language will now be provided, followed by a detailed description of the preferred embodiments.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to one degree or another.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed. Additionally, any pointers in the persistent objects must be accounted for during externalization. This requires converting the pointer to an object "name" for storage, and then turning it back when the externalized object is recreated. All these process required for externalizing the state data for storage, dealing with internal pointers, and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Java Programming Language

Java is a modern object-oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM).

Java source code is compiled into bytecodes that can be interpreted to run on any type of platform. These bytecodes are platform neutral and must be used in conjunction with a Java runtime environment. The Java runtime environment provides the functionalities necessary to interpret bytecodes for use on a particular type of platform. The compiled Java source code must be used in conjunction with a Java runtime environment.

The JVM model is supported by most computer vendors, thereby allowing a software vendor to have access to hardware and software systems produced by many different companies. Finally, Java is an object-oriented language, meaning that software written in Java can take advantage of the benefits of object-oriented programming techniques. As in other object-oriented systems, operations in Java are performed by one object calling a method on another object. These objects can reside locally on the same machine or on separate JVM's physically located on separate computers or systems.

One particular problem associated with Java is object persistence. As mentioned, persistent objects are objects which exist beyond the lifetime of the process from which they were created. Java currently requires the use of mixin class or other methods that are not transparent to the user. Thus, the problems associated with creating, using and storing persistent objects in Java are significant.

Memory and File Systems

Modern computers use a variety of methods to manage, access and store data in computer systems. Computer systems typically contain two main types of data storage, transient data storage such as DRAM, and persistent storage such as hard disk drives, optical drives and such. Several systems exist for managing the flow of information between these storage mediums and the processors that execute the programs.

Most commodity computer systems today, such as IBM compatible personal computers running IBM's OS/2 or Microsoft's Windows, use a system called two-level store (TLS). TLS systems use a file system for storing data on permanent storage and a virtual memory system for running application processes. Included in the virtual memory system of TLS systems is a specialized data file called a swap file. The swap file is used as "extra memory" to store data for application processes that are too large to be loaded into the limited amount of "real memory".

In TLS systems a file manager keeps a directory that relates the name of a file to the location on the disk where the data for the file is stored. The file manager provides an interface to allow programs to "read" a file. The data from the file is then copied into memory, which include the real memory and the swap file. There, the data can be used and manipulated. When the program is finished with the data, a "write" operation is performed, which causes the data to be moved from the virtual memory back to the file on the disk.

In most TLS virtual memory systems, each application process is assigned its own virtual address space. For example, when the central computer creates a first process, the underlying operating system allocates a virtual address space for use by this process only. As the process executes the operating system will allocate real memory chunks for usage by the process. As each real chunk is allocated, the operating system will also create a mapping of the process virtual addresses to real memory. This procedure would be repeated for other application processes running on the same computer. As the real memory becomes over committed, the contents of the real memory can be temporarily moved to the swap file and the real memory portion reused by other processes.

When an application processes is started, the data for the application must first be moved from its permanent storage file to the virtual memory system. This typically involves copying a portion of the application into real memory and a portion of the application into the swap file. The application then runs from the real memory, using its virtual addressing while the operating system moves portions of the application between real memory and the swap file as needed.

This system does have its advantages. For example, because the operating system hides the complexity of real memory system and swap file from the application, it is easier to write applications. Second, it isolates each process from all others so that bugs in one processes do not usually cause bugs in other processes.

The system unfortunately also has several disadvantages. One of these is the context dependent nature of the virtual addresses. Because each application uses a virtual address range that has no meaning to other applications, addresses cannot be easily shared between applications. For example, only the first application process could access its allocated chunk of memory, but cannot access data in a second chunk of memory which belongs to the second process.

This context dependency is especially troubling for persistent objects, which by definition can outlive the application processes which created them. Persistent objects typically contain address pointers which reference valid information when created. However, as mentioned, the TLS model creates memory for each process and destroys the memory when the process is eliminated. Therefore, when a persistent object is created, the pointers contained within the object remain valid only as long as the application which created the persistent object is in memory. Once the persistent object is saved onto backing store, the meaning of the pointers within the object are lost.

In order to avoid this problem, externalization techniques are required to convert the pointer to an object "name" when storing the persistent object. When the persistent object is retrieved from backing store and a new runtime representation of the object is created, the object name must be converted to a new valid pointer. This process of creating a new runtime copy of the persistent objects and converting pointer references contained within persistent objects results in significant overhead on the CPU.

The single level storage (SLS) model was developed in response to the memory management problems described above. The SLS system maps all of the data storage mediums, generically referred to as backing store, into a single large address space. The backing store can include any type of local storage medium, such as magnetic and optical disk drives, and can also include the storage mediums of multiple computer systems connected by large networks. In the SLS model each byte of data contained within this large backing store area is addressed using its own unique, context independent virtual address. This makes the entire storage system function as a single "virtual memory" with a context independent addressing scheme.

The SLS model is very efficient means of making and manipulating persistent objects because it reduces the amount of system overhead to store and retrieve persistent objects from backing store. In an SLS system, persistent objects, including pointers to other objects contained within the persistent object, can be stored in backing store without modification.

This is allowed because pointers stored in persistent objects in an SLS system are context independent. Because all applications share the same large virtual address space, all pointers to objects remain valid regardless of their context. This eliminates the need for converting pointer references to "names" when storing persistent objects.

Thus, no separate steps are required to store persistent objects to backing store, such as those required to externalize object data in TLS systems. Likewise, no separate steps are needed to retrieve persistent objects from backing store. When a persistent object is needed from backing store, the persistent object can be simply copied from backing store into a memory buffer, with no recreation required. Thus, SLS systems eliminate the need to create different runtime and storage versions of persistent objects. Because persistent objects can be simply copied from backing store to/from memory as needed, processor overhead in dealing with persistent objects is significantly reduced.

Furthermore, because all address pointers are context independent, they can be easily shared between processes. In contrast, the context dependent pointers of TLS are valid only in the processes that created them and cannot be shared without some difficultly.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems cannot use the SLS model and continue to have no easy way to provide object persistence, in whether in Java or other programing environments.

2. Detailed Description

Referring now to FIG. 1, a computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In this example, memory 130 includes a Virtual Machine (VM) 182 running in location 132, a client process 184 running in location 134, a Factory Class 183 in location 136, and a Persistent Container object 222 in location 137.

Client process 184 may generate various amounts of important data and may wish for this data to exist beyond its own lifetime in memory. In order for the data created by a client process 184 to exist beyond its lifetime in memory, the data must be stored persistently. Persistent storage allows data to exist beyond the lifetime of the process which created it. In this case, the data created by client process 184 would exist even after client process 184 was removed from memory 130, if it is saved persistently.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computers that collectively comprise system 100. For example, Java Virtual Machine 182 may reside on one computer with $CPU_1$ and Persistence Mechanism 186 may reside on another computer system with a separate $CPU_2$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and materials for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM compatible personal computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. In the preferred embodiment the network interface 175 provides a connection to the Internet and the World-Wide-Web, but could also be to connect to other networked environments, such as internal web-based systems (typically called Intranets). The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

The preferred embodiment of the present invention implements a JVM that allows data to be stored persistently in a shared address space using single level store (SLS) semantics. When an application requests persistent storage, backing store is allocated on the machine for physically storing the data and a corresponding portion of shared address space is allocated. Any machine or process sharing the SAS can then access the persistent data, regardless of its physical location on backing store, using its corresponding 128 bit SAS address. Client processes or applications running on client machines can request persistent storage from a shared persistent storage system. Persistent objects can then be created and stored in that persistent storage.

Specifically, the present invention defines several objects used to implement Persistent Java objects in a shared address space. The preferred embodiment includes a static Factory class, a Persistent Container class, a Persistent Expanding Container class, a Class Encapsulator class, an Object Encapsulator class and a Persistent Handle class. The Factory class, the Persistent Container class and the Persistent Expanding Container class are preferably defined to include methods that facilitate interaction of the JVM with SAS and are preferably implemented using a language that can work closely with the underlying system, such as C++. The Class Encapsulator class and the Object Encapsulator class are preferably designed to encapsulate the data from Java classes and Java objects of those classes, respectively. In particular, a Class Encapsulator object would preferably be created in a Persistent Container for each class of Java objects loaded into that Persistent Container. The Class Encapsulator object would include all of the specific data needed to implement its corresponding Java class. Likewise, an Object Encapsulator object would preferably be created to encapsulate each Java object to be stored persistently in the shared address space. These classes are also preferably implemented using a language that can work closely with the underlying system, such as C++, although they are designed to encapsulate data for the classes and objects that run in the virtual machine, such as Java. The Persistent Handle class is preferably defined to store the SAS address of the Class Encapsulator object and the Object Encapsulator object. In particular, in the preferred embodiment a Persistent Handle object is created for each persistent Java object that is stored in the shared address space. Each Persistent Handle object preferably includes the 128 bit SAS address of the corresponding Class Encapsulator object and the 128 bit SAS address of the corresponding Object Encapsulator object.

Thus, in the preferred embodiment persistent Java objects are stored in the shared address space using three objects that work together 1) a Class Encapsulator object which stores the class data for the persistent Java object, 2) a Object Encapsulator object which stores the instance data for the persistent Java object, and 3) a Persistent Handle object which stores SAS pointers to the corresponding Class Encapsulator object and Object Encapsulator object.

Figure 2:
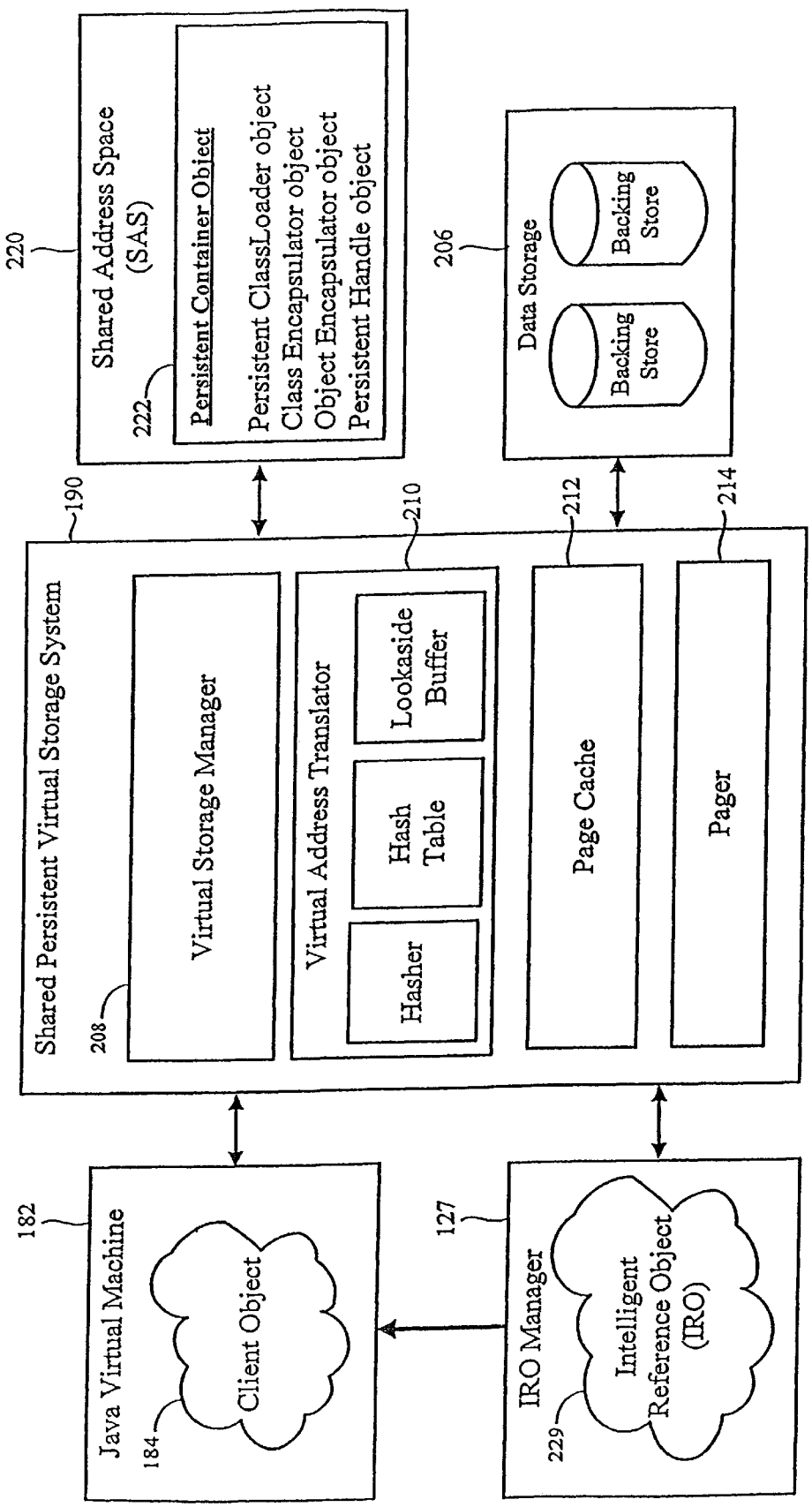
FIG. 2 is a functional block diagram illustrating a shared address space (SAS), its components and a JVM working in conjunction with the shared address space.

Now referring to FIG. 2, a client object 184, a Java Virtual Machine 182, a shared persistent virtual storage system 190, a shared address space (SAS) 220 and a data storage 206 are shown. The shared persistent virtual storage system 190 manages the large shared address space (SAS) 220, performs address translations as necessary, and controls the retrieval and storage of SAS data in data storage 206. In accordance with the preferred embodiment, the shared persistent virtual storage system 190 includes a virtual storage manager 208, a virtual address translator 210, a page cache 212, and a pager 214. The virtual storage manager 208 allocates and deallocates portions of the SAS 220 to portions of the data storage 206 as needed. The virtual address translator 210 translates 128 bit SAS addresses to 32 bit native addresses when requested by client objects. The pager 214 brings pages of data from data storage 206 and stores the page in the page cache 212 when data in that page is needed by client objects.

In the preferred embodiment, the shared address space 220 is segmented into logical subdivisions. These logical subdivisions facilitate administration of the shared address space by allowing different processes to be assigned different portions of the shared address space. Furthermore, these subdivisions facilitate system administration by allowing system administrators to separately define user rights (e.g., who can read objects, who can create objects, who can write objects, who can allocate space) for each subdivision. In the preferred embodiment, these subdivisions include cohorts, with each cohort addressing $2^{64}$ bytes, and with each cohort further subdivided into blocks.

To facilitate management of the shared address space 220, a plurality of data structures are provided by the shared persistent virtual storage system 190. These data structures would preferably include cohort data structures for each created cohort, and block data structures for each created block in the cohort, and data structures for each allocated page within a block. The cohort data structures would preferably include pointers to block data structures which reside in the corresponding cohort. The block data structures would preferably include the information needed to retrieve data in the corresponding block from data storage 206. For example, in one embodiment each block containing persistent data is stored as a separate file in the file system of data storage 206. In this case, each block data structure would include the name of the file in which the corresponding block is located. When the pager 214 needs to retrieve a page of persistent data from backing store 206 it retrieves the name of the file containing the page from the corresponding block data structure. The shared persistent storage system 190 can then request the required data from the data storage 206 file system using that file name. It should be noted that the preferred embodiment can be adapted to work with any type of data storage system and their associated file systems.

When the virtual address translator 210 receives an SAS address to translate it runes the SAS address through hasher 215 to generate a key number n. The hash table 216, preferably a list of pointers to page table entry lists, is then searched to locate the page table entry list in the lookaside buffer 218 corresponding to that key number n. The page table entry list corresponding to that key number n in the lookaside buffer 218 is then searched to determine if requested data is in the page cache 212. If the data is in page cache, a 32 bit address corresponding to the location of the data in the page cache is returned. If the data is not in the page cache, the pager 214 retrieves the page of data in which the requested data is located from the backing store 404 and loads that page into the page cache 212. The 32 bit native address of the data in the page cache 212 can then be returned.

It should be understood that in this application the term shared address space refers to the large address space that allows applications to store persistent data using single level store semantics. Likewise, the term native address as used in this application refers to an address that can be used by the underlying system to retrieve data from the page cache. As such, the native address is typically a 32 bit virtual address as used in the two level store of the underlying system. Of course, the underlying system is not required to use 32 bit addressing and can instead use any size native addressing.

In the preferred embodiment, the shared address space uses large 128 bit virtual addressing to provide single level storage semantics for two-level store systems. Of course the shared address space is not required to be 128 bits, it can be any size large enough to effectively address the needed data using single level store semantics.

In accordance with the preferred embodiment, an intelligent reference object 229 is used to transparently encapsulate SAS to 32 bit address translations for all objects, classes or handle references accessed by the JVM 182. In this application the use of the term "target object" will be used to collectively refer to all the objects, classes and handles referenced through intelligent reference objects. In the preferred embodiment, these target objects specifically include the Class Encapsulator objects, Object Encapsulator objects and Persistent Handle objects used to store persistent Java objects in the shared address space. Thus, when a client process makes a request to access a target object (e.g., an Object Encapsulator object), the intelligent reference object 229 encapsulating the address translation to facilitate access to the target object.

Specifically, field accesses made on target objects are received by the intelligent reference object 229 corresponding to the target object. The intelligent reference object 229 then provides any address translation and indirection needed to allow the field access to be performed on the target object. In the case where the target object is a persistent object stored in the page cache, this involves converting the SAS address to a 32 bit address of the target object in the page cache. This 32 bit address can then be used by the IRO to perform the field access on the target object.

In the preferred embodiment the IROs include a plurality of methods used to perform field access on the target objects. As a few examples, these methods preferably include: a load(offset, length, dest ptr) method, a loadX(goffset, dest ptr) method (where X can be 1, 2, 4, 8 or 16 bytes), a store(offset, length, from ptr) method, a storeX(offset, from ptr) method (where X can be 1, 2, 4, 8 or 16 bytes), a store(offset, IRO ptr) method, a copy(offset, IRO ptr, offset, length) method, a compare(offset, IRO ptr, offset, length) method, a compare(offset, target ptr, length) method. These methods provide a mechanism for the JVM to perform field accesses on persistent and transient target objects.

The intelligent reference objects 229 are preferably created and cached by IRO Managers 127. Specifically, in the preferred embodiment IRO Managers create and cache IROs for each thread of execution in an application. In particular, each time an address translation is performed, an IRO is created and cached by the IRO Manager corresponding to the current thread of execution.

With the IROs stored in the IRO Manager cache, they can be quickly located as needed. In particular, when the JVM requests an address translation, the hash table property of the IRO Manager cache is utilized to quickly search the cache for an existing IRO that encapsulates the needed address translation. If such an IRO is not found in the IRO Manager cache, the IRO Manager interacts with the virtual address translator 210 to translate the SAS address. An IRO that encapsulates the new address translation is then created by the IRO Manager 127 and put into its cache under the current frame. Finally, the address of the IRO is returned to the JVM.

Contained within SAS 220 is Persistent Container object 222. A Persistent Container object is an object that provides a storage area for persistent objects. A Persistent Container object must be created before any persistent objects can be stored in SAS 220. To facilitate storage of persistent objects in the Persistent Container object 222, the Persistent Container object preferably includes a Persistent ClassLoader object 244. Additionally, the Persistent Container object would preferably include a Class Encapsulator object 246 for each class of persistent Java objects stored in the Persistent Container object and a Object Encapsulator object 247 and Persistent Handle Object 250 for each instance of the persistent Java objects in the Persistent Container object.

As explained, a Persistent Container object sets aside a block of shared address space for the storage of persistent Java objects (as encapsulated by Class Encapsulator objects, Object Encapsulator objects and Persistent Handle objects. In the preferred embodiment, a Java programmer does not need to know any of the implementation details associated with the Persistent Container, Class Encapsulator objects, Object Encapsulator objects and Persistent Handle objects.

Methods defined for Persistent Container object 222 have the responsibility of allocating and deallocating portions of its address space to persistent Java objects. Persistent Container object 222 has methods designed to allocate and deallocate portions of the SAS and corresponding backing store by maintaining a free list which designates all of the free allocations in the Persistent Container object and an occupied list which contains a list of all of the occupied allocations in the Persistent Container object.

When the Factory class creates Persistent Container object 222, the Factory class simultaneously creates Persistent ClassLoader object 244. Each Persistent Container object 222 has its own Persistent ClassLoader object 244 to load class data, in the form of a Class Encapsulator object containing the class data, into the Persistent Container object in which it is contained.

In the preferred embodiment, the Factory class does not create a Class Encapsulator object 246 in a Persistent Container object 222 until an application requests creation of a persistent Java object of that class. When an application calls a method on the Factory class requesting creation of a Java object, the Factory class calls a method on Persistent ClassLoader object 244 to determine whether the Java class corresponding to the requested object has already been loaded into a Class Encapsulator object in the Persistent Container object 222. If the Class Encapsulator object 246 containing the Java class needs to be loaded into SAS, Persistent ClassLoader creates a Class Encapsulator object into the Persistent Container object 222 containing a Java class data from the Java class file in the file system.

Once the Class Encapsulator object corresponding to the requested Object Encapsulator object has been loaded into SAS 220, the static Factory class can create a Object Encapsulator object when a request to create a persistent Java object is made. The Object Encapsulator object will store the specific instance data for the new persistent Java object. Likewise, multiple persistent Java objects can be created by storing their instance data in Object Encapsulator objects as long as the Class Encapsulator object corresponding to Java class has been loaded into the Persistent Container object.

A Persistent Handle object is preferably created when Object Encapsulator objects are created to store instance data of a persistent Java object. The Persistent Handle object preferably includes the SAS reference to the corresponding Object Encapsulator object and its corresponding Class Encapsulator object Thus, to create and store persistent objects of a Java class in the Persistent Container object, the Persistent ClassLoader object is used to create a Class Encapsulator object which contains the Java data needed to implement that class, if it has not already been created for that Persistent Container. With the Class Encapsulator object for that class created, the Factory class creates an Object Encapsulator object to store the specific data needed for that persistent Java object in the Persistent Container and a Persistent Handle object to store the SAS addresses of the corresponding Class Encapsulator object and Object Encapsulator object. Thus, once a Persistent Container object is created, an application can create, store and interact with persistent objects therein.

In the preferred embodiment, each Object Encapsulator object 248 is implemented to include C++ methods needed to interface with the persistent storage system and a data section that stores the instance data for the Java object associated with the corresponding Java class (as stored in a Class Encapsulator object).

For purposes of understanding the preferred embodiment, it is useful to describe the different levels of abstractions used in the JVM and what the perceptions are of a programmer at those levels. The highest level is that of the Java programmer. At this level, the programmer defines Java objects and references to Java objects. In the preferred embodiment, this would include the ability to define and use objects persistently. The details of how these Java objects are made persistent are hidden from the Java programmer. And that persistent object can be created by calling methods on the Container class and Expanding Container class via the Factor class. Knowledge of other details in the persistence implementation are not required.

At the first level below the java programmer is the implementation of the JVM. In the preferred embodiment, the JVM is implemented using an object-oriented language such as C++. The JVM is preferably implemented to include and work with the Persistent Container objects, Persistent ClassLoader objects, Class Encapsulator objects, Object Encapsulator objects and Persistent Handles to create, store and interact with persistent Java objects. Java class information such as methods, fields and constant pool data is loaded into Class Encapsulator object by the Persistent ClassLoader object in the Persistent Container object, where it can be retrieved as needed. Java object interaction such as field data reads and writes are performed on the Object Encapsulator object. The Persistent Handle object is created to persistently store SAS address pointers to the Object Encapsulator object and its corresponding Class Encapsulator object for each persistent object.

The workings of the persistence system below this level are essentially transparent to the JVM. In particular, the JVM does need to know of the implementation of the IRO's and the details of the address translation system, including the paging of data from backing store into the page cache, page reference counts, and the other details of the simulated single level store.

The following is a simplified example of how this system works together. The example performs a field access on an account object. In particular, loading 10.00 into a "balance"

field of account object "X". This assumes that an IRO for a "customer" object which contains a reference to account object "X" is already on the stack. A getfieldo operation is then performed to retrieve the account object "X" reference from the customer object. The reference for the account object "X" would preferably be in the form of a 128 bit SAS address of the Persistent Handle corresponding to the account object.

In performing the getfieldo operation, the customer object IRO loads the 128 bit SAS address of the Persistent Handle object and recognizes that this address must be translated to a native address of the Persistent Handle object in the page cache. In the preferred embodiment, the IRO Manager cache is first checked to determine if an IRO corresponding to the 128 bit SAS address already exists for the current thread. If the IRO does not already exist, the lookaside buffer is checked using the hasher and hash table to quickly determine if the page of data containing the 128 bit SAS address of Persistent Handle object is already in the page cache. If it is in the page cache, an IRO is created encapsulating the address translation. In particular, an IRO is created that includes the 128 bit SAS address and the 32 bit native address of the Persistent Handle object in the page cache. The 32 bit address of the IRO is then returned to the JVM. If the page of data containing the Persistent Handle object is not in the page cache, it is brought in by the pager before the IRO is created.

With the address of the IRO for the Persistent Handle object, the JVM can perform a field access on the Persistent Handle object using one of the methods defined on the IRO for performing field accesses. In our example, a load( ) method would be used to retrieve the 128 bit SAS addresses of the Class Encapsulator object and the Object Encapsulator object for the account object "X".

These SAS address can then be used to complete the field access. In particular, the JVM will then retrieve the class data from the Class Encapsulator object to determine the offset at which the "balance" field resides in account objects. This is done by using the 128 bit SAS of the Class Encapsulator object.

Of course, when Persistent Handle IRO encounters the 128 bit SAS address of the Class Encapsulator object, it again recognizes that this address must be translated to a the appropriate native address. Again, this preferably involves checking the IRO Manager cache for an existing IRO (for the Class Encapsulator object), checking the lookaside buffer as needed, bringing in pages of data to the page cache as needed, and creating a new IRO as needed. The 32 bit address of the IRO for the Class Encapsulator object is then returned to the JVM.

With the address of the IRO for the Class Encapsulator object, the JVM can perform a field access on the Class Encapsulator object to retrieve the needed class data. In our example, a load( ) method on the IRO could be used to retrieve the correct offset of the "balance" field from the class data stored in the Class Encapsulator object for "account" objects.

With the correct offset, the JVM will then perform the field access on the account object instance data itself. In particular, the JVM will use the 128 bit SAS address of the Object Encapsulator object (retrieved from the Persistent Handle object) and the offset obtained from the Class Encapsulator object to perform the desired field access.

Of course, when Persistent Handle IRO encounters the 128 bit SAS address must be translated to the appropriate native address of the Object Encapsulator object. Again, this preferably involves checking the IRO Manager cache for an existing IRO (for the Object Encapsulator object), checking the lookaside buffer as needed, bringing in pages of data to the page cache as needed, and creating a new IRO as needed. The 32 bit address of the IRO for the Object Encapsulator object is then returned to the JVM.

With the native address of the IRO for the Object Encapsulator object, the JVM can perform a field access on the instance data. In our example, a storeo method using the offset parameter retrieved from the Class Encapsulator object would be called on the IRO to put new balance of 10.00 in the account object.

Thus, in the preferred embodiment, the JVM interacts Persistent Handle objects, Class Encapsulator objects, Object Encapsulator objects and their associated IROs to interact with persistent Java objects stored in the shared address space. Of course, the details of how this system provides interaction with persistent objects is transparent to the Java programmer.

It should be understood that the Class Encapsulator objects and Object Encapsulator objects do not always exist within the Persistent Container object. Rather, these objects are created when an application running on JVM 182 requests creation of Java objects. Thus, while Persistent Container object 222 will be described as containing these objects, these objects will not necessarily exist at all times.

Figure 3:
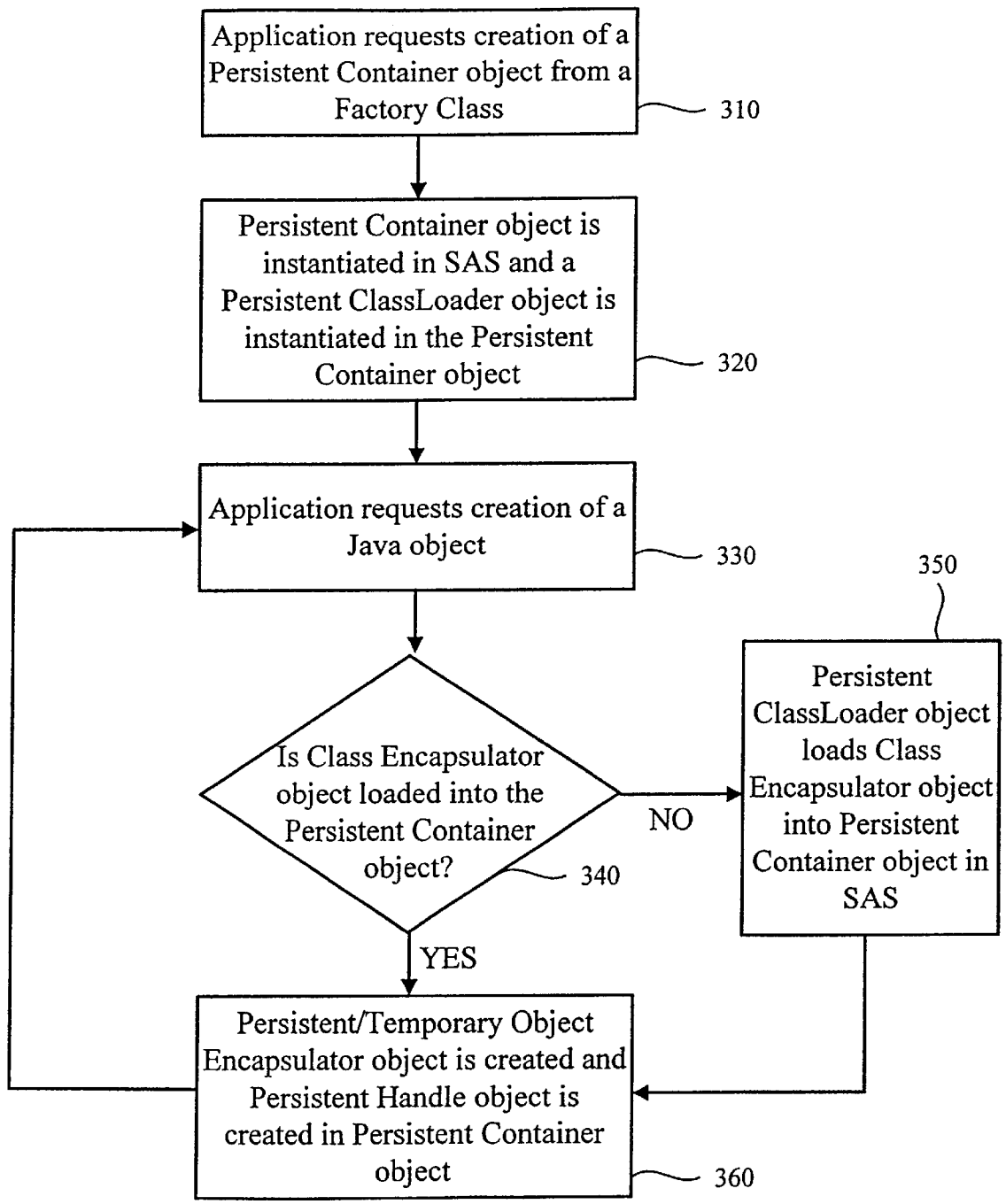
FIG. 3 is a flow diagram depicting a method for creating objects in SAS needed to implement Persistent storage.

Now referring to FIG. 3 a method for creating persistent Java objects shown. FIG. 3 is provided in order to demonstrate the sequence of the creation of several objects: Persistent Container object, Persistent ClassLoader object, Class Encapsulator object, Object Encapsulator object and Persistent Handle object as needed to facilitate the creation of a Persistent Object in SAS. As discussed above , these objects are preferably implemented C++ which can interact closely with the underlying system As discussed above, these operations of these C++ objects are completely hidden from the user. The user only knows and sees that persistent Java objects can be and have been created. In particular, Persistent Container object provides the storage area in SAS where a Class Encapsulator object and all of the instances of the Persistent Class (Object Encapsulator object) can be stored. Once Persistent Container object and Persistent ClassLoader object are instantiated, Class Encapsulator objects can be loaded into the Persistent Container object by Persistent ClassLoader object. As mentioned, Class Encapsulator objects are C++ objects that contain a Java class. Once Class Encapsulator objects are created into the Persistent Container object, instances of those Class Encapsulator objects, known as Object Encapsulator objects can be created into the Persistent Container object. Persistent Handle objects are then created for each Object Encapsulator object, to provide a reference between the Object Encapsulator object and its class, Class Encapsulator object.

Method 300 begins when an application calls a method on a static Factory class requesting creation of a Persistent Container object. The static Factory class is responsible for calling methods on other objects to create objects and containers in response to requests from an application to create these objects and containers. In response to this request, the Factory class calls a method on a Container class to create a Persistent Container object (step 320). A Persistent Container object is simply a 16 MB chunk of SAS set aside to store data. As mentioned SAS is a large shared address space where data can be stored persistently.

When the Factory class creates a Persistent Container object, it also simultaneously creates a Persistent Class- Loader object in the Persistent Container object (step 320). Preferably, each Persistent Container object has only one Persistent ClassLoader object to keep track of allocations/deallocations in the Persistent Container object. The Persistent ClassLoader object manages the Persistent Container object by maintaining a list of all of the classes located within the Persistent Container. The Factory Class can call methods on the Persistent ClassLoader object to determine whether a particular Java class (stored in a Class Encapsulator object) has been loaded into the Persistent Container object.

Once the Persistent Container object has been created, an application can call methods on the static Factory class to request creation of a Java object (step 330). It should be understood that the object can be a temporary object to be stored in process local storage, or a permanent object to be stored in SAS storage. The present invention implements process local storage as an area of SAS so that all objects references will have a 128 bit address. Objects stored in process local storage will be removed once the process that created them terminates.

Before an object can be created, the Class Encapsulator object corresponding to the object must be loaded into SAS. As mentioned, a Class Encapsulator object contains a Java class and the C++ methods needed for the object to communicate with SAS. When an application calls a method on the Factory class requesting creation of a Java object, the Factory class calls a method on the Persistent ClassLoader to determine whether the Class Encapsulator object corresponding to the Java object has been loaded into the Persistent Container object (Step 340). It should be understood that a Java class is always stored persistently in a Persistent Container object in SAS. Any temporary or permanent instances of the Java class are created from the Class Encapsulator object stored in SAS.

If the Persistent ClassLoader object determines that the Class Encapsulator object containing the definition for the Java class is not already located within the Persistent Container object (Step 340=NO), the Persistent ClassLoader object loads the Persistent Class into a Class Encapsulator object in the Persistent Container object (step 350).

Once the Class Encapsulator object is loaded into SAS, a Object Encapsulator object can be created (Step 360). The Java class contained within the Class Encapsulator object is used to create the data section of the Object Encapsulator object. As mentioned, a Object Encapsulator object contains all of the C++ methods needed for the object to communicate with SAS and a Java object data section as defined by the Class Encapsulator object. An application can create persistent Java objects or temporary Java objects from the Class Encapsulator object located in SAS.

When a Java object (Object Encapsulator object) is created, a Persistent Handle object is also created in the Persistent Container object (step 360). The Persistent Handle object contains SAS address references to the Class Encapsulator object and the Object Encapsulator object just created. In the preferred embodiment It should be understood that there is a Persistent Handle object stored in SAS for each Object Encapsulator object. Methods can be called on the Persistent Handle object to lock a particular persistent Java object to prevent other threads from accessing the Java data.

As shown in FIG. 3, once the Class Encapsulator object is loaded into the Persistent Container object, an application can create any number of Object objects in the Persistent Container object or in process local storage. Steps 330 through 360 may be repeated several times based upon the requests made by an application.

Now referring to FIG. 4, the preferred methods defined for Persistent Container object, Persistent ClassLoader object, Class Encapsulator object, Object Encapsulator object and Persistent Handle object as needed to implement persistent shared address space are shown.

Class Encapsulator object 246 preferably contains a plurality of the C++ methods that the object needs to communicate with SAS and a Java class definition. These methods on Class Encapsulator objects 246 preferably include newinstance, method forName, method getName, method getSuperclass, method getInterfaces, method getClassloader and method isInterface. A constructor copies the class file associated with the class to be loaded into SAS 220 from the file system into persistent storage (SAS). The makeup of the class being loaded into SAS 220 is defined by the class file. More particularly, the class file is a set of bytes representing the dynamic structures and arrays that describe the executable unit of the class. Method newinstance can be called to create a temporary instance of a Java class in process local storage. Method newinstance will create a Object Encapsulator object in process local storage as defined by a Class Encapsulator object. Method forName returns a reference to a class object when provided with a string denoting the name of a class. Method getName returns a Java class name. Method getSuperclass returns the superclass of the Class Encapsulator object on which it is called. Method getInterfaces lists all the interfaces that a class supports. GetClassLoader returns a reference to the loader that loaded a particular class. Method isinterface indicates whether a class is an interface specification as opposed to a class.

The preferred embodiment introduces copy on write storage which provides access to static variables. Static variable as defined by a class file are stored at a particular address in SAS copy on write storage. When an instance of a class is created, any static variables defined for that class are created using the definitions stored in the class file in SAS. The present invention allows static variables to be shared among instances of a class running in a particular JVM. However, different JVMs do not access the same static variables. Each JVM has its own copies of any static variables defined for a class of which it has an instance.

A static variable defined for a class will be shared by all instances of that class on a particular JVM. Static storage for a class is associated with the class and not each instance of the class. Thus, if class A has been defined to include static variables and there are two instances of class A, the two instances can access the static variables defined for class A. If one instance accesses and changes the value of a static variable, then when the second instance accesses the static variable, the value of the variable will be equal to the value set by the first instance. All instances of a class see the change to a static variable made by another instance.

Static variables are not shared among JVMs. As each JVM is instantiated, the JVM receives its own copy of static variables when an instance of a class containing static variables is created. When one JVM makes changes to the static variables defined for a class, the static variables defined for that class running on other JVMs are not changed. There are no sharing of static variables among JVMs.

The preferred embodiment of Persistent Container objects 222 include several methods. These methods include: method allocObject, method allocObjectnear, method allocArrayNear, method allocStringNear, method allocArrayofNear and method deallocObject. In the preferred embodiment, only a static Factory class calls methods allocObject, allocObjectNear, allocArrayNear, allocStringNear, allocArrayofNear and method deallocObject on Persistent Container object 222. The Factory class calls these methods on Persistent Container object 222 in response to an application requesting allocation of shared address space from the Factory class.

Persistent ClassLoader object 244 preferably contains a list of all of the classes within a Persistent Container object. Several methods can be called on Persistent ClassLoader 244 including method findClass and loadClass. When method findClass( ) is called on Persistent ClassLoader object 244, findClass( ) searches the list of classes contained with Persistent ClassLoader object 244 to determine whether a Class Encapsulator object containing the definition for a specified Java class is already loaded into the Persistent Container object. If a Class Encapsulator object is already loaded into Persistent Container object 222, method findClass simply returns the reference of the class.

Conversely, if the class is not already loaded into Persistent Container object 222, method findClass loads the class into Persistent Container object 222. Method findClass searches all of the classes loaded into a Persistent Container object to find a particular class. If method findClass does not find the class in SAS, method findClass calls method loadClass. Method loadClass automatically loads a class from the class file on backing store into a Class Encapsulator object in the Persistent Container object 222. Method loadClass can also be called directly by bypassing method findClass. When method loadClass is called directly, a class is loaded into a Persistent Container object automatically, even if a copy of the class has already been loaded into the Persistent Container object.

Object Encapsulator object 248 provides methods for allowing getfield( ) putfield( ) to access data in SAS. Methods getfield( ) and putfield( ) are generic bytecodes, specific methods for each type are defined by Object Encapsulator object. When the bytecodes for the methods are determined, the implementation of that method will use the interpretation to call a specified getfield( ) or putfield( ) on an object. For example, an interpreted bytecode may call a specific type of getfield( ) or putfield( ) method such as getfieldlong( ) or putfieldint( ) on an object. Persistent Object also contains methods for containing persistent arrays.

A Persistent Handle object 250 is preferably created for each Java object stored in the shared address space. The Persistent Handle object 250 is preferably crated at the same time the Object Encapsulator object 246 is created to store the instance data of the Java object. Persistent Handle object 250 preferably includes a reference to a Class Encapsulator object 246 and a reference to a Object Encapsulator object 248. Persistent Handle objects 250 preferably include two methods, a method lock and method decrementlock. Method lock places a lock on a specified Java object referenced by Persistent Handle object 250.

In the preferred embodiment, when a thread enters a synchronized method in Java, an implicit lock is obtained for the thread for that object. When the JVM is interpreting an invocation to a method that requires synchronization of the object the JVM obtains a lock for that object before entering the method. The JVM simply calls the synchronized method when a thread enters a particular method, and the synchronized method places a lock on that object for the calling thread. Any other threads that try to gain access to the object will be denied since a lock is on the object. Once the thread which owns the lock is through with the method, the lock is removed. Each time a synchronize method is entered, method lock will be called on Persistent Handle and when the synchronize method is excited, decrement lock will be called on Persistent Handle.

A preferred embodiment of the present invention also modifies portions of the JVM to work in conjunction with shared address space (SAS). Specifically, in the preferred embodiment the JVM can store objects in either temporary local storage or in permanent SAS storage 220. However, current JVM provide only the ability to crate transient Java objects, meaning that objects could only be stored in temporary storage. These transient objects would be deleted from memory as soon as the application which created them was removed from memory. The preferred embodiment modifies the interpretation of bytecodes associated with objects, classes, classloaders and handles to interact with temporary and persistent SAS storage since the native bytecodes were designed to interact only with temporary storage.

Specifically, the preferred embodiment modifies the implementation of Java bytecodes to work in conjunction with temporary and persistent storage (SAS) without modifying the behavior or function of the bytecodes. As mentioned, the Java bytecodes are hidden from the user in the JVM implementation level. The JVM interprets the bytecodes on any class that the user happens to be running. While the new implementations of the bytecodes will be discussed, it should be understood that the following discussion of the bytecodes is only limited to the JVM view. It is important to remember that the Java programmer needs no knowledge of the Intelligent Reference Objects or the implementation details of the shared persistent storage. In reality, when a bytecode is executed, the JVM view performs the instruction as described below. However, the actual implementation as seen by the C++ objects on which calls are being made by the user (e.g., the Class Encapsulator object, the Object Encapsulator object, the Persistent Handle), uses Intelligent References Objects to access data stored in shared address space. Therefore it should be understood that in the following discussion of the bytecodes, that when a persistent object is being accessed, the JVM view simply performs methods on these persistent objects, but the C++ level of abstraction uses Intelligent References to access these persistent objects in shared address space.

The preferred embodiment modifies the interpretations of the following Java bytecodes to work in conjunction with an IRO: getfield( ), putfield( ), getstatic( ), putstatic( ), iaload( ), laload( ), faload( ), daload( ), aaload( ), baload( ), caload( ), saload( ), iastore( ), lastore( ), fastore( ), dastore( ), aastore( ), bastore( ), castore( ), sastore( ), arraylength ( ), ldc1( ), ldc2( ), ldcw2( ), invokevirtual( ), invokestatic( ), invokeinterface( ), invokespecial( ), new( ), newarray( ), multiANewArray( ), AnewArray( ), checkCast( ), instanceOf( ), monitorEnter( ) and monitorExit( ). The original implementations of these bytecodes along with the corresponding modifications shall now be described.

The original implementation of the getfield( ) bytecode adds together the arguments supplied with the getfield( ) call to obtain a 16 bit offset. The JVM then uses this 16 bit offset to index a Class Reference entry. Once the Class Reference entry is found, the actual object reference is popped off the stack using resolved class information from the Class Reference entry. The value is then retrieved from the object reference and pushed onto the stack.

A preferred embodiment of the present invention modifies the instructions performed by the getfield( ) bytecode.

Specifically, the modified getfield( ) bytecode first pops a reference corresponding to a persistent object and the offset corresponding to the location of the desired data in the object off the stack. The desired data is retrieved from the persistent object at the designated offset and pushed back onto the stack. Therefore, it can be assumed that the object is loaded into the page cache by the SAS Server when a getfield( ) bytecode is executed.

The preferred embodiment of the present invention also modifies the putfieldo bytecode. The native putfield( ) bytecode inserts a piece of data into an object's non-static field. The native putfield( ) bytecode adds the arguments provided to putfield( ) to create a 16 bit offset. Putfield( ) then resolves the class, the field and the size of the data and its offset into the object. The data is then placed into the object at the determined offset.

The present invention modifies the putfield( ) bytecode by popping a reference off the stack corresponding to a persistent object and the offset where data is to be placed off the stack. The data is then stored in the persistent object at the location indicated by the offset.

The preferred embodiment of the present invention also modifies the original uptstatic( ) bytecode which places a value into a class's static field. Specifically, the original uptstatic( ) bytecode pops a fieldref arguments off the stack to create a 16 bit offset into the Constant Pool to a Field Reference entry. The original putfield( ) bytecode then resolves the class, the field and the size of the value. The value is then popped from the stack and placed into the class's static area at the determined offset.

The modified putstatic( ) bytecode performs the same as the original uptstatic( ) bytecode except that the class which is resolved is now a persistent class.

The present invention also modifies the native getstatic( ) bytecode. The original getstatic( ) bytecode retrieves a value from a class's static field. The arguments provided to native getstatic( ) are first added together to create a 16 bit offset into the Constant Pool to a Field Reference entry. The class, field, and size of the value to be retrieved, and its offset into the class size are then determined and the value is retrieved from the class's static field area and pushed on top of the stack.

The modified getstatic( ) bytecode performs substantially the same as the original getstatic( ) bytecode except that a value is retrieved from a Class Encapsulator object's static field.

The preferred embodiment of the present invention also modifies the native iaload( ), laload( ), faload( ), daload( ), aaload( ), baload( ), caload( ) and saload( ) bytecodes. The native iaload( ) bytecode pops an array index and an integer array object reference off the stack and pushes the element onto the stack. The native laload( ) bytecode pops an array index and a long array object reference off the stack and pushes the element onto the stack. The native faload( ) bytecode pops an array index and a float array object reference off the stack and pushes the element onto the stack. The native daload( ) bytecode pops an array index and a double array object reference off the stack and pushes the element onto the stack. The native aaload( ) bytecode pops an array index and an object reference array object reference off the stack and pushes the element onto the stack. The native baload( ) bytecode pops an array index and a signed byte array object reference off the stack and pushes the element back onto the stack. The native caload( ) bytecode pops an array index and a char array object reference off the stack and pushes the element onto the stack. The native saload( ) bytecode( ) pops an array index and a short array object reference off the stack and pushes the element onto the stack.

The present invention modifies the native iaload( ), laload( ), faload( ), daload( ), aaload( ), baload( ), caload( ) and saload( ) bytecodes. Specifically, each of these bytecodes retrieve a reference to a persistent array object reference from the stack. The XXload( ) bytecode then pushes the value from the specified index in the array onto the stack.

The preferred embodiment of the present invention also modifies the native iastore( ), lastoreo( ), fastoreo( ), dastoreo( ), aastore( ), bastoreo( ), castoreo( ) and sastore( ) bytecodes. The original iastore( ) bytecode pops an integer value, an array index and an integer array object reference off the stack and stores the integer value in the array element. The lastore( ) bytecode pops a long value, an array index and a long array object reference off the stack and stores the long value in the array element. The fastore( ) bytecode pops a float value, an array index, and a float array object reference off the stack and stores the float value in the array element at index. The dastoreo( ) pops a double value, an array index, and a double array object reference off the stack and stores the double value in the array element at index. The aastore( ) pops an object reference, an array index, and an object reference array object reference off the stack and stores the object reference in the array element at index. The bastore( ) pops a signed byte value, an array index, and a signed byte array object reference off the stack and stores the signed byte value in the array element at index. The castore( ) bytecode pops a char value, an array index, and a char array object reference off the stack and stores the char value in the array element at index. The sastoreo( ) bytecode pops a short value, an array index, and a short array object reference off the stack and stores the short value in the array element at index.

The present invention modifies the iastore( ), lastore( ), fastore( ), dastoreo( ), aastore( ), bastoreo( ), castoreo( ) and sastoreo( ) bytecodes. Each of the bytecodes still store values into array objects, however now the bytecodes store values into persistent array objects. The modified XXstore( ) bytecodes pop an integer value, an array index and a reference to a persistent array object off the stack. The XXstore( ) bytecode then stores the value into the persistent array at the indicated index.

The present invention also modifies the arraylength( ) bytecode. Specifically, the original arraylength( ) bytecode pops an array reference off the stack, retrieves the length out of the array and pushes the length back onto the stack.

The modified arraylengtho bytecode accesses a particular array using an IRO. Specifically, the modified arraylength( ) bytecode pops a persistent array reference off the stack. The arraylength( ) bytecode then retrieves the length out of the array object and pushes the value onto the stack.

Other modified bytecodes include ldc1( ), ldc2( ) and ldc2w( ). The original ldc1( ) bytecode uses an 8 bit index into the Constant Pool of the current class to locate a value. The ldc1( ) bytecode then pushes the value retrieved from the Constant Pool onto the stack. The original ldc2( ) bytecode uses a 16 bit index into the Constant Pool to locate a value, once the value is located, ldc2( ) pushes the value onto the stack. The original ldc2w( ) bytecode uses a 16 bit index into the Constant Pool to locate a long or double. Bytecode ldc2w( ) then pushes the long or double at that position on the stack.

The modified ldc1( ), ldc2( ), and ldc2w( ) bytecodes work in conjunction with a persistent class. When any of the ldcXX( ) bytecodes make an index into the Constant Pool, the current class is a Persistent Class.

The present invention also modifies the invokevirtual( ), invokestatic( ), invokeinterface( ), and invokespecial( ) bytecodes. The original invokevirtual( ) bytecode invokes an instance method of the object reference on the stack based on dynamic type lookup. A 16 -bit offset into the Constant Pool to a Method Reference entry is obtained by adding arguments together. The class, method signature, and location of the method's bytecodes are resolved dynamically to determine the number of arguments and the sizes that need to be popped off the stack. The arguments and the object reference of the class containing the method to be called are then popped off the stack. A new frame is then created containing the object reference and arguments as the first local variables. The invokevirtual( ) bytecode then passes control to the method.

The original invokestatic( ) bytecode invokes a class's static method. Specifically bytecode invokestatic( ) adds two index values popped off the stack to construct an index into the constant pool of the current class. The value at the index has a tag, a reference to a class name, a method name and the method's descriptor. Bytecode invokestatic( ) resulting in a resolved method that has a descriptor that must be identical to the descriptor of one of the method of the resolved class.

The original invokeinterface( ) bytecode invokes an object's interface method. Bytecode invokeinterface( ) works very similar to bytecode invokevirtual( ) except that the third argument represents the number of arguments to the method.

The original invokespecial( ) bytecode invokes an instance method and provides special handling for superclass, private, and instance initialization method invocations. Bytecode invokespecial( ) uses two arguments to construct and index into the constant pool of the current class where the value of an index is located. The item has a tag, a reference to a class name, a method name, and the method's descriptor. The method is then resolved.

The modified invokevirtual( ), invokestatic( ), invokeinterface( ), and invokespecial( ) bytecodes have the same function as the original bytecodes except that when a reference to the constant pool is made, the current class is a persistent class.

The present invention also modifies the new( ), newarray( ), multianewarray( ), and anewarray( ) bytecodes. The original new( ) bytecode creates a new object based upon the class type specified by the arguments. A 16 bit Constant Pool index to a Class Reference entry is obtained from adding together arguments. The class information is resolved and a new object reference is created for the class. The new( ) bytecode then pushes the object reference onto the stack.

The original newarray( ) bytecode allocates a new array containing elements from one of the Java native data types. The newarray( ) bytecode is able to determine the number of elements in the new array by referencing the stack at the entry to this opcode, where the number of elements is specified. A 16 bit Constant Pool index to the class type that will be referenced by the array is then determined by adding together the arguments provided to newarray( ).

The original multianewarray( ) bytecode allocates a new multidimensional array that contains elements of object references. An entry on the stack indicates the number of elements to allocate per dimension at the entry to this bytecode. A 16 bit Constant Pool index to the class type that the array elements will reference is then derived from adding together arguments supplied to the bytecode. A third argument specifies the number of dimensions that the array should contain.

The original anewarray( ) bytecode allocates a new array containing elements of object references. An entry on the stack indicates the number of elements to allocate. A 16 bit constant Pool index to the class type that will be referenced by the array elements is derived from adding together arguments from the stack.

The modified new( ), newarray( ), multianewarray( ), and anewarray( ) bytecodes work substantially in the same function as the original bytecodes described above. However, now when a bytecode makes a reference into the Constant Pool, the current class is a persistent class.

The present invention also modifies the checkcasto and instanceof( ) bytecodes. The original checkcast( ) bytecode verifies that a cast operation is valid for a particular object reference as specified by an entry at the top of the stack. The checkcast( ) bytecode obtains a 16 bit offset into the Constant Pool index to a Class Reference entry by adding together arguments supplied to the bytecode. The class information is then resolved and the type of object reference on the top of the stack is compared to the type of class specified by the Constant Pool entry. If the object on the stack is an instance of the class found in the Constant Pool or one of its superclasses, execution continues with the next instruction.

The original instanceof( ) bytecode verifies that an object is of the specified type based on arguments supplied to the bytecode. A 16 bit Constant Pool index to a Class Reference entry is then obtained by adding together arguments supplied to the bytecode. The class information is resolved and the object reference is popped off the stack. The bytecode then compares the type of the object to the type of class specified by the Constant Pool entry. If the bytecode determines that the object on the stack is an instance of the class found in the Constant Pool or one of its superclasses, then the integer value 1 is pushed on the stack. Otherwise, the value 0 is pushed on the stack.

The modified checkcast( ) and instanceof( ) bytecodes work substantially the same as described above. However, when the class information is resolved, the current class is a persistent class.

The present invention also modifies the original monitorenter( ) and monitorexit( ) bytecodes. The original monitorenter( ) bytecode enters a monitored section of the current bytecode stream and pops the object reference off the top of the stack. The bytecode then tries to allocate an exclusive lock on the object reference. If the bytecode determines that another monitor has already locked the object, then the bytecode waits until the object is unlocked. However, if the object not already locked, a new exclusive lock is allocated on the object.

The original monitorexit( ) bytecode leaves a monitored section of the current bytecode stream and pops an object reference off the top of the stack. The exclusive lock on the specified object reference is removed. Once the object is unlocked and if no other threads have the specified object locked, any other threads waiting for the object are notified that the object is now available.

The present invention modifies the monitorenter( ) and monitorexit( ) bytecodes by moving the lock to be within a persistent handle. The modified monitorenter( ) and monitorexit( ) bytecodes check the persistent handle object associated with a particular object to determine if a lock has been placed on an object and also to place locks on an object.

Another change needed to implement the preferred embodiment is to modify the garbage collection mechanism of the JVM. Specifically, the preferred embodiment implements two garbage collectors, one for the IRO heap and one for temporary Java objects. Each time a new method is entered, a new stack frame is created. When leaving a stack frame, all of the IROs pointed to in that stack frame could be freed. As stack frames are exited, any IROs that are no longer needed are freed. When additional IROs are needed, the garbage collector looks through all active frames and marks all of those IROs as in use. Any IROs left over in the IRO heap that are not marked are then freed up for use.

When heaps other than the IRO heap reach thresholds, the second garbage collector performs a trace to see which objects in the heap at threshold reach other objects. Once these objects are located, the second garbage collector marks these objects as in use. Any objects which do not reach other objects are then freed up.

An application running on a local machine can call methods on a persistent Factory class to request persistent storage. Before any persistent objects can be stored in SAS, a holding area for these objects, known as a "container" must be created in SAS. An application can call method newPermInstance on the Factory class to explicitly request creation of a persistent container. The Factory class works in conjunction with a Container class to derive a persistent container object. The Container class defines certain methods which must be used for creating persistent objects within the container object. When an application requests creation of a persistent object, the factory calls methods on the persistent container object where the persistent object will be placed. Thus, before any objects can be created, a container object must be created to hold the objects and aid in the creation of the objects which it will contain.

Once a persistent container object is created, applications can create persistent objects within that persistent container. For example, an application can call newInstanceIn, newInstanceWith, or newInstanceNear on the Factory class to create persistent objects in a specified location within a specified persistent container object. The Factory class then works in conjunction with methods defined for the particular persistent container object to create persistent objects within the container.

Several helper objects help the Factory class create persistent objects. For example, the Persistent Container object works in conjunction with a ClassLoader object, a Persistent Class and a persistent Handle object to create persistent objects. These objects must be loaded into SAS before persistent objects can be created.

Thus, the preferred embodiment of the present invention facilitates the creation, storage and interaction of persistent objects using single level storage semantics on commodity systems. Specifically, the present invention defines several objects used to implement Persistent Java objects in SAS. The preferred embodiment includes a static Factory class, a Persistent Container class, a Persistent Expanding Container class, a Class Encapsulator class, an Object Encapsulator class and a Persistent Handle class. The Class Encapsulator class and the Object Encapsulator class are preferably designed to encapsulate the data from Java classes and Java objects of those classes, respectively. In particular, a Class Encapsulator object would preferably be created in a Persistent Container for each class of Java objects loaded into that Persistent Container. The Class Encapsulator object would include all of the specific data needed to implement its corresponding Java class. Likewise, an Object Encapsulator object would preferably be created to encapsulate each Java object to be stored persistently in the shared address space. The Persistent Handle class is preferably defined to store the SAS address of the Class Encapsulator object and the Object Encapsulator object. By creating and using these objects, persistent Java objects can be created in the shared address space.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   an object encapsulator object residing in the memory, the object encapsulator object storing instance data for a corresponding persistent object to facilitate the storage of the corresponding persistent object in a shared address space, wherein the shared address space is implemented using single level store semantics to facilitate context independent addressing of the corresponding persistent object in the shared address space.

2. The apparatus of claim 1 further comprising a class encapsulator object, the class encapsulator object storing class data for the persistent object.

3. The apparatus of claim 2 further comprising a persistent handle object, the persistent handle object including a shared address space address of the object encapsulator object and the class encapsulator object for the corresponding persistent object.

4. The apparatus of claim 2 wherein the corresponding persistent object comprises an interpreted object for execution on a virtual machine.

5. The apparatus of claim 4 wherein the interpreted object is a Java object and wherein the virtual machine is a Java virtual machine.

6. The apparatus of claim 5 wherein the object encapsulator object, the class encapsulator object, and the persistent handle object comprises C++ objects.

7. The apparatus of claim 2 wherein the object encapsulator object and the class encapsulator object are mapped to a portion of the shared address space defined by a persistent container object.

8. The apparatus of claim 7 wherein the persistent container object further includes a classloader object for creating class encapsulator objects.

9. The apparatus of claim 1 further comprising an intelligent reference object corresponding to the object encapsulator object, the intelligent reference object including a SAS address of the object encapsulator object and a native address of the object encapsulator object.

10. The apparatus of claim 9 wherein the native address of the object encapsulator object comprises an address of the object encapsulator object in a page cache.

11. The apparatus of claim 10 wherein the shared address space comprises a 128-bit address space.

12. The apparatus of claim 11 wherein the native address space comprises a 32 bit address space.

13. A method for providing persistent storage of a persistent object in a shared address space, wherein the shared address space is implemented using single level store semantics to facilitate context independent addressing of the persistent object in the shared address space, the method comprising the steps of:

a) encapsulating instance data for the persistent object in an object encapsulating object;

b) encapsulating class data for the persistent object in an class encapsulating object;

c) storing the object encapsulating object persistently in the shared address space; and d) storing the class encapsulating object persistently in the shared address space.

14. The method of claim 13 wherein the step of encapsulating class data for the persistent object in an class encapsulating object comprises calling a classloader object in a persistent container object.

15. The method of claim 13 further comprising the step of creating a persistent handle object, the persistent handle object including a shared address space address of the class encapsulating object and a shared address space address of the object encapsulating object.

16. The method of claim 13 further comprising the step of creating an intelligent reference object corresponding to the object encapsulating object, the intelligent reference object including the a native address of the object encapsulating object and a shared address space address of the object encapsulating object.

17. The method of claim 16 wherein the step of creating an intelligent reference object corresponding to the object encapsulating object comprises bringing a page of data corresponding from backing storage to page cache and wherein the native address of the object encapsulating object comprises an address of the object encapsulating object in the page cache.

18. The method of claim 17 wherein the native address comprises a 32 bit address space.

19. The method of claim 17 wherein the step of performing a field access on the object encapsulator object comprises calling a method on the intelligent reference object corresponding to the object encapsulator object such that the intelligent reference object performs the field access.

20. The method of claim 16 further comprising the step of performing a field access on the object encapsulator object.

21. The method of claim 13 wherein the object encapsulator object and the class encapsulator object are created a portion of shared address space reserved by a persistent container object.

22. The method of claim 13 wherein the object encapsulator object and the class encapsulator object are implemented as C++ objects, and wherein instance data encapsulated in the object encapsulator object comprises Java instance data and wherein the class data encapsulated in the class encapsulator object comprises Java class data.

23. The method of claim 13 wherein the shared address space comprises a 128 bit address space.

24. A program product comprising:

(A) an object encapsulator object, the object encapsulator object storing instance data for a corresponding persistent object to facilitate the storage of the corresponding persistent object in a shared address space, wherein the shared address space is implemented using single level store semantics to facilitate context independent addressing of the corresponding persistent object in the shared address space; and (B) signal bearing media bearing the object encapsulator object.

25. The program product of claim 24 wherein the signal bearing media comprises recordable media.

26. The program product of claim 24 wherein the signal bearing media comprises transmission media.

27. The program product of claim 24 further comprising a class encapsulator object, the class encapsulator object storing class data for the persistent object.

28. The program product of claim 27 further comprising a persistent handle object, the persistent handle object including a shared address space address of the object encapsulator object and the class encapsulator object for the corresponding persistent object.

29. The program product of claim 27 wherein the corresponding persistent object comprises an interpreted object for execution on a virtual machine.

30. The program product of claim 29 wherein the interpreted object is a Java object and wherein the virtual machine is a Java virtual machine.

31. The program product of claim 30 wherein the object encapsulator object, the class encapsulator object, and the persistent handle object comprises C++ objects.

32. The program product of claim 27 wherein the object encapsulator object and the class encapsulator object are mapped to a portion of the shared address space defined by a persistent container object.

33. The program product of claim 32 wherein the persistent container object further includes a classloader object for creating class encapsulator objects.

34. The program product of claim 24 further comprising an intelligent reference object corresponding to the object encapsulator object, the intelligent reference object including a SAS address of the object encapsulator object and a native address of the object encapsulator object.

35. The program product of claim 34 wherein the native address of the object encapsulator object comprises an address of the object encapsulator object in a page cache.

36. The program product of claim 35 wherein the shared address space comprises a 128-bit address space.

37. The program product of claim 35 wherein the native address space comprises a 32 bit address space.

38. An apparatus comprising:

a) at least one processor;

b) a memory coupled to the at least one processor;

c) a virtual machine residing in memory;

d) an object encapsulator object residing in the memory, the object encapsulator object storing instance data for a corresponding persistent object to facilitate storage of the corresponding persistent object in a shared address space, wherein the shared address space is implemented using single level store semantics to facilitate context independent addressing of the corresponding persistent object in the shared address space;

e) a class encapsulator object residing in the memory, the class encapsulator object storing class data for the persistent object to facilitate storage of the corresponding persistent object in the shared address space; and f) a persistent handle object residing in the memory, the persistent handle object including a shared address space address of the object encapsulator object and the class encapsulator object for the corresponding persistent object.

39. The apparatus of claim 38 wherein the corresponding persistent object comprises an interpreted object for execution on the virtual machine.

40. The apparatus of claim 39 wherein the interpreted object is a Java object and wherein the virtual machine is a Java virtual machine.

41. The apparatus of claim 38 wherein the object encapsulator object, the class encapsulator object, and the persistent handle object comprises C++ objects.

42. The apparatus of claim 38 wherein the object encapsulator object and the class encapsulator object are mapped to a portion of the shared address space defined by a persistent container object.

43. The apparatus of claim 42 wherein the persistent container object further includes a classloader object for creating class encapsulator objects.

44. The apparatus of claim 38 further comprising an intelligent reference object corresponding to the object encapsulator object, the intelligent reference object including a SAS address of the object encapsulator object and a native address of the object encapsulator object.

45. The apparatus of claim 44 wherein the native address of the object encapsulator object comprises an address of the object encapsulator object in a page cache.

46. The apparatus of claim 44 wherein the virtual machine performs field accesses on the object encapsulator object using methods defined on the intelligent reference object corresponding to the object encapsulator object.

47. The apparatus of claim 46 wherein the methods defined on the intelligent reference object include load( ), store( ), copy( ) and compare( ).

48. The apparatus of claim 44 further comprising:
i) an intelligent reference object corresponding to the class encapsulator object, the intelligent reference object for the class encapsulator object including a SAS address of the class encapsulator object and a native address of the class encapsulator object in the page cache, the intelligent reference object for the class encapsulator object including load( ), store( ), copy( ) and compare( ) methods to perform field accesses on the class encapsulator object; and
ii) an intelligent reference object corresponding to the persistent handle object, the intelligent reference object for the persistent handle object including a SAS address of the persistent handle object and a native address of the persistent handle object in the page cache, the intelligent reference object for the persistent handle object including load( ), store( ), copy( ) and compare( ) methods to perform field accesses on the persistent handle object.

49. The apparatus of claim 38 wherein the shared address space comprises a 128-bit address space.

50. The apparatus of claim 38 wherein the native address space comprises a 32 bit address space.

51. The apparatus of claim 38 wherein virtual machine comprises bytecodes that perform on object encapsulator objects, class encapsulator objects, and persistent handle objects through corresponding intelligent reference objects.

52. The apparatus of claim 38 wherein class encapsulator object includes the class data from a Java class file.

53. The apparatus of claim 38 wherein class encapsulator object includes interfaces, fields, methods and class level attributes of the corresponding class.

54. The apparatus of claim 38 wherein class encapsulator object includes a method to create a temporary instance in a process local storage.

55. A method for providing persistent storage of a persistent object in a shared address space and performing field accesses on the persistent object, wherein the shared address space is implemented using single level store semantics to facilitate context independent addressing of the corresponding persistent object in the shared address space, the method comprising the steps of:

a) encapsulating instance data for the persistent object in an object encapsulator object;
b) encapsulating class data for the persistent object in an class encapsulator object;
c) creating a persistent handle for the persistent object, the persistent handle including a shared address space address of the object encapsulator object and a shared address space of the class encapsulating object;
d) storing the object encapsulator object, the class encapsulator object, and the persistent handle in backing storage;
e) obtaining an intelligent reference object for the object encapsulator object, the intelligent reference object for the object encapsulator object including a plurality of field access methods, the shared address space address of the object encapsulator object and a native address of the object encapsulator object; and
f) performing a field access on the object encapsulator object by calling one of the plurality of field access methods on the intelligent reference object for the object encapsulator object.

56. The method of claim 55 wherein the step of obtaining an intelligent reference object for the object encapsulator object comprises checking an IRO Manager cache for the current thread.

57. The method of claim 55 wherein the step of obtaining an intelligent reference object for the object encapsulator object comprises retrieving a page of data storing the object encapsulator object from the backing storage and loading the page of data into a page cache, and creating an intelligent reference object such that the native address of the object encapsulator object comprises the native address of the object encapsulator object in the page cache.

58. The method of claim 55 wherein the object encapsulator object and the class encapsulator object are created a portion of shared address space reserved by a persistent container object.

59. The method of claim 55 wherein the object encapsulator object and the class encapsulator object are implemented as C++ objects, and wherein instance data encapsulated in the object encapsulator object comprises Java instance data and wherein the class data encapsulated in the class encapsulator object comprises Java class data.

60. The method of claim 55 further comprising the steps of:
i) obtaining an intelligent reference object for the persistent handle object, the intelligent reference object for the persistent handle object including a plurality of field access methods, the shared address space address of the persistent handle object and a native address of the persistent handle object; and
ii) performing a field access on the persistent handle object by calling one of the plurality of field access methods on the intelligent reference object for the persistent handle object.

61. The method of claim 60 wherein the step of performing a field access comprises retrieving the shared address space address of the object encapsulator object.

62. The method of claim 60 wherein the step of performing a field access comprises retrieving the shared address space address of the class encapsulator object.

63. The method of claim 55 further comprising the steps of:
i) obtaining an intelligent reference object for the class encapsulator object, the intelligent reference object for the class encapsulator object including a plurality of field access methods, the shared address space address of the class encapsulator object and a native address of the class encapsulator object; and ii) performing a field access on the class encapsulator object by calling one of the plurality of field access methods on the class encapsulator object for the persistent handle object.

64. The method of claim 63 wherein the step of performing a field access comprises retrieving the offset for a specified field.

65. The method of claim 55 wherein the shared address space is a 128 bit address space.

66. A program product comprising:
A) a computer program including:
  i) a virtual machine;
  ii) an object encapsulator object, the object encapsulator object storing instance data for a corresponding persistent object to facilitate storage of the corresponding persistent object in a shared address space, wherein the shared address space is implemented using single level store semantics to facilitate context independent addressing of the corresponding persistent object in the shared address space;
  iii) a class encapsulator object, the class encapsulator object storing class data for the persistent object to facilitate storage of the corresponding persistent object in the shared address space; and
  iv) a persistent handle object, the persistent handle object including a shared address space address of the object encapsulator object and the class encapsulator object for the corresponding persistent object; and
(B) signal bearing media bearing said computer program.

67. The program product of claim 66 wherein the signal bearing media comprises recordable media.

68. The program product of claim 66 wherein the signal bearing media comprises transmission media.

69. The program product of claim 66 wherein the corresponding persistent object comprises an interpreted object for execution on the virtual machine.

70. The program product of claim 69 wherein the interpreted object is a Java object and wherein the virtual machine is a Java virtual machine.

71. The program product of claim 66 wherein the object encapsulator object, the class encapsulator object, and the persistent handle object comprises C++ objects.

72. The program product of claim 66 wherein the object encapsulator object and the class encapsulator object are mapped to a portion of the shared address space defined by a persistent container objects.

73. The program product of claim 72 wherein the persistent container object further includes a classloader object for creating class encapsulator objects.

74. The program product of claim 66 further comprising an intelligent reference object corresponding to the object encapsulator object, the intelligent reference object including a SAS address of the object encapsulator object and a native address of the object encapsulator object.

75. The program product of claim 74 wherein the native address of the object encapsulator object comprises an address of the object encapsulator object in a page cache.

76. The program product of claim 74 wherein the virtual machine performs field accesses on the object encapsulator object using methods defined on the intelligent reference object corresponding to the object encapsulator object.

77. The program product of claim 76 wherein the methods defined on the intelligent reference object include load( ), store( ), copy( ) and compare( ).

78. The program product of claim 77 further comprising:
  i) an intelligent reference object corresponding to the class encapsulator object, the intelligent reference object for the class encapsulator object including a SAS address of the class encapsulator object and a native address of the class encapsulator object in the page cache, the intelligent reference object for the class encapsulator object including load( ), store( ), copy( ) and compare( ) methods to perform field accesses on the class encapsulator object; and
  ii) an intelligent reference object corresponding to the persistent handle object, the intelligent reference object for the persistent handle object including a SAS address of the persistent handle object and a native address of the persistent handle object in the page cache, the intelligent reference object for the persistent handle object including load( ), store( ), copy( ) and compare( ) methods to perform field accesses on the persistent handle object.

79. The program product of claim 66 wherein the shared address space comprises a 128-bit address space.

80. The program product of claim 66 wherein the native address space comprises a 32 bit address space.

81. The program product of claim 66 wherein virtual machine comprises bytecodes that perform on object encapsulator objects, class encapsulator objects, and persistent handle objects through corresponding intelligent reference objects.

82. The program product of claim 66 wherein class encapsulator object includes the class data from a Java class file.

83. The apparatus of claim 66 wherein class encapsulator object includes interfaces, fields, methods and class level attributes of the corresponding class.

84. The apparatus of claim 66 wherein class encapsulator object includes a method to create a temporary instance in a process local storage.

* * * * *